US012672208B1

(12) United States Patent
Cai

(10) Patent No.: US 12,672,208 B1
(45) Date of Patent: Jun. 30, 2026

(54) HEATING LUNCH BOX

(71) Applicant: Zhe Cai, Shenzhen (CN)

(72) Inventor: Zhe Cai, Shenzhen (CN)

(73) Assignee: Zhe Cai, Shenzhen (CN)

( * ) Notice: Subject to any disclaimer, the term of this patent is extended or adjusted under 35 U.S.C. 154(b) by 0 days.

(21) Appl. No.: 19/345,455

(22) Filed: Sep. 30, 2025

Related U.S. Application Data

(63) Continuation of application No. 19/074,034, filed on Mar. 7, 2025, now Pat. No. 12,457,665.

(51) Int. Cl.

| | |
|---|---|
| ***B65D 43/22*** | (2006.01) |
| ***B65D 43/02*** | (2006.01) |
| ***B65D 81/34*** | (2006.01) |
| ***H05B 1/02*** | (2006.01) |

(52) U.S. Cl.
CPC ....... *H05B 1/0261* (2013.01); *B65D 43/0212* (2013.01); *B65D 81/3476* (2013.01); *H05B 1/0225* (2013.01); *B65D 2543/00712* (2013.01)

(58) Field of Classification Search
CPC .... H05B 1/0225; H05B 1/0261; B65D 43/00; B65D 43/0204; B65D 43/0212; B65D 43/163; B65D 81/34; B65D 81/3453; B65D 81/3476; B65D 81/3813; B65D 2543/00009; B65D 2543/00712; B65D 2543/00731; A45C 11/20; A47J 36/24; A47J 36/2483; A47J 36/26
See application file for complete search history.

(56) References Cited

U.S. PATENT DOCUMENTS

| | | | | |
|---|---|---|---|---|
| 2009/0200296 | A1 * | 8/2009 | Iwasaki | B29C 45/33 220/254.2 |
| 2017/0137205 | A1 * | 5/2017 | Graf | A45C 13/005 |
| 2022/0250824 | A1 * | 8/2022 | Alexander | F25D 29/00 |

FOREIGN PATENT DOCUMENTS

| | | | | |
|---|---|---|---|---|
| CN | 112268383 A | * | 1/2021 | F25D 11/02 |
| CN | 115571492 A | * | 1/2023 | B65D 51/1644 |
| KR | 20240150211 A | * | 10/2024 | H02J 7/0048 |

* cited by examiner

*Primary Examiner* — Hung D Nguyen
(74) *Attorney, Agent, or Firm* — AVEK IP, LLC

(57) ABSTRACT

A heating lunch box includes a food box, and a heating main body for accommodating the food box and heating the food box. The heating main body includes a casing for accommodating the food box, a built-in power supply, a heating module, and a processor mounted in the casing. The heating main body further includes a touch display screen attached to an outer side of the casing. The touch display screen is configured to display a heating setting interface for receiving at least one heating setting instruction input by user and display a heating interface which shows heating time related information. The processor is configured to acquire at least a heating start time according to the heating time related information, and the heating module is configured to heat the food box accommodated in the accommodating cavity according to the heating start time.

11 Claims, 13 Drawing Sheets

FIG. 13
12:48 AM
How Long Would You Like to Heat?
*Heating may take more time in winter.
0
18
30
Mins
CONFIRM

HEATING LUNCH BOX

CROSS-REFERENCE TO RELATED APPLICATIONS

The present disclosure is a continuation of U.S. patent application Ser. No. 19/074,034, filed on Mar. 7, 2025, titled “HEATING LUNCH BOX”.

TECHNICAL FIELD

The present invention relates to the technical field of lunch boxes, particularly to a heating lunch box.

BACKGROUND ART

The highly developed modern manufacturing technology has greatly improved people’s living standards, and people’s demand for healthy eating is also increasing. In daily life, people use lunch boxes to bring food and achieve nutritious and healthy eating.

However, most of the lunch boxes produced in the prior art have a simple heat preservation, and when people start to eat, the food in the lunch box has been cold, and the user needs an external heating tool for heating. However, in some public places, due to insufficient heating tools, the user often needs to wait, the waiting time is long, and the practicability of the lunch box is deficient. The design of the existing lunch box is not humanized, which lacks the functions of convenient interaction, intelligent time control and the like. It is difficult for the user to flexibly set the heating time and mode according to the user’s own needs, and certain limitations exist in the actual use scene of the lunch box.

SUMMARY

In order to overcome the shortcomings of the prior art, a heating lunch box is provided in the present invention, which is convenient to use, thereby effectively improving the practicality of the lunch box.

The technical solution adopted by the present invention to solve its technical problem is as follows.

A heating lunch box includes a food box for accommodating food, a heating module for heating the food box, an interaction module, and a processor coupled to the heating module and the interaction module.

The processor is configured for performing the following operations:

- obtaining a power-on instruction, in response to the obtained power-on instruction, controlling the interaction module to display an initial interface, and the initial interface at least including a first time setting control;
- when a trigger event of the first time setting control is detected, controlling the interaction module to display a time selection interface;
- obtaining a set time from the time selection interface;
- controlling the interaction module to display a heating interface based on the set time; and
- driving the heating module to heat the food box.

Beneficial effects of the present invention are as follows. The processor receives the power-on instruction, and controls the interaction module to display the initial interface based on the power-on instruction. The first time setting control of the the initial interface reminds the user of the importance of a meal time, allowing a user to operate the first time setting control on the initial interface to generate a trigger event. When the processor receives the trigger event of the first time setting control, the interaction module is controlled to display the time selection interface. The user selects time on the selection interface to form the set time, and the processor receives the set time, so that the heating module can be automatically controlled to heat the food box, and the user can eat on time without waiting, thereby effectively improving the intelligence of the lunch box, the user experience, and the practicality of the lunch box.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE EMBODIMENTS

Figure 1:
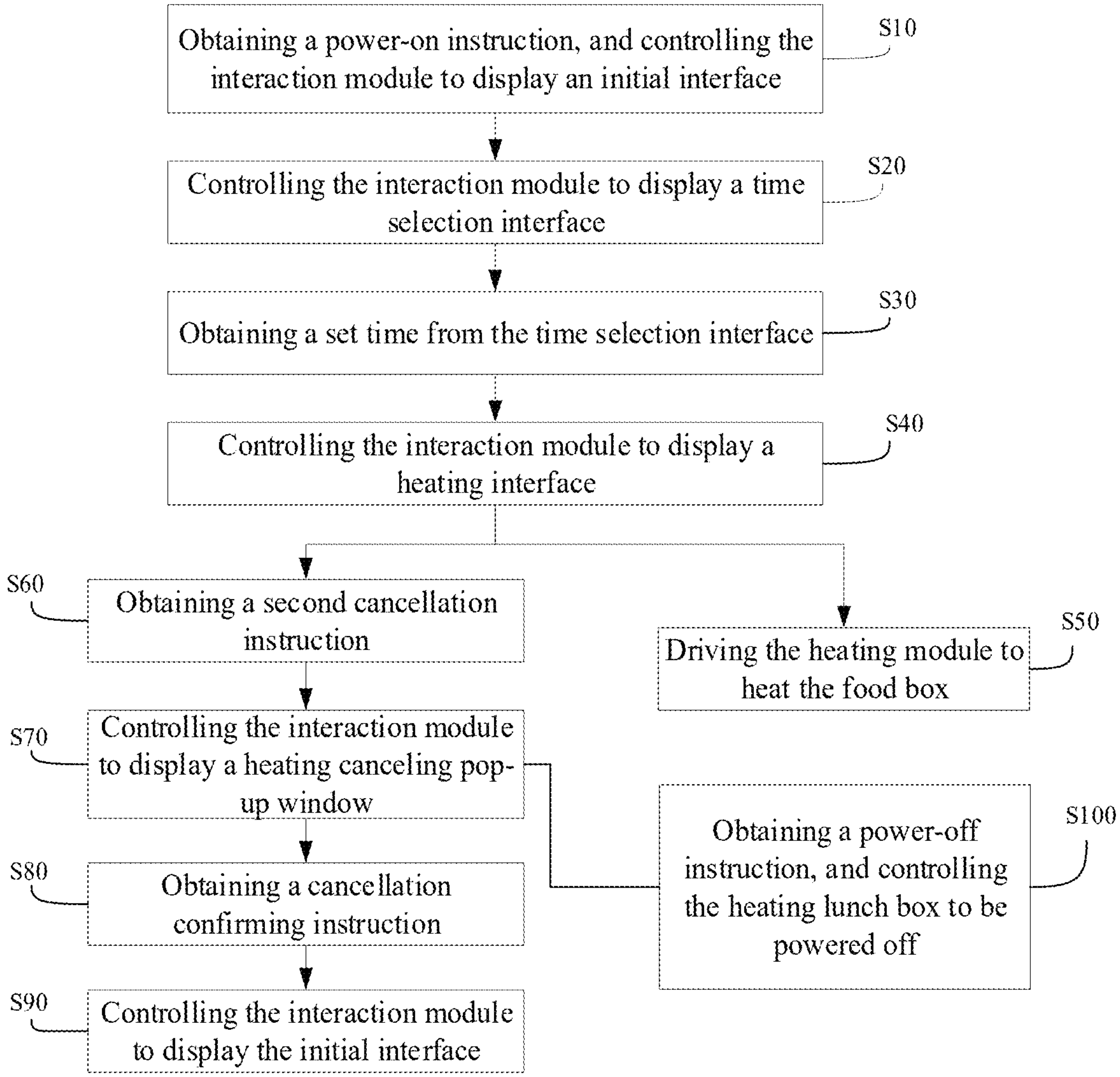
FIG. 1 is a flow diagram of an embodiment of the present invention.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term “comprising” when utilized, means “including, but not necessarily limited to”; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to “an” or “one” embodiment in this disclosure are not necessarily to the same embodiment, and such references can mean “at least one”. In addition, the terms “first” and “second” are used for descriptive purposes only and cannot be understood as indicating or implying relative importance or implying the number of indicated technical features. Thus, the features defined as “first” and “second” may explicitly or implicitly include one or more of the features. In the description of embodiments of the application, “a plurality of” means two or more, unless otherwise specifically defined.

Figure 8:
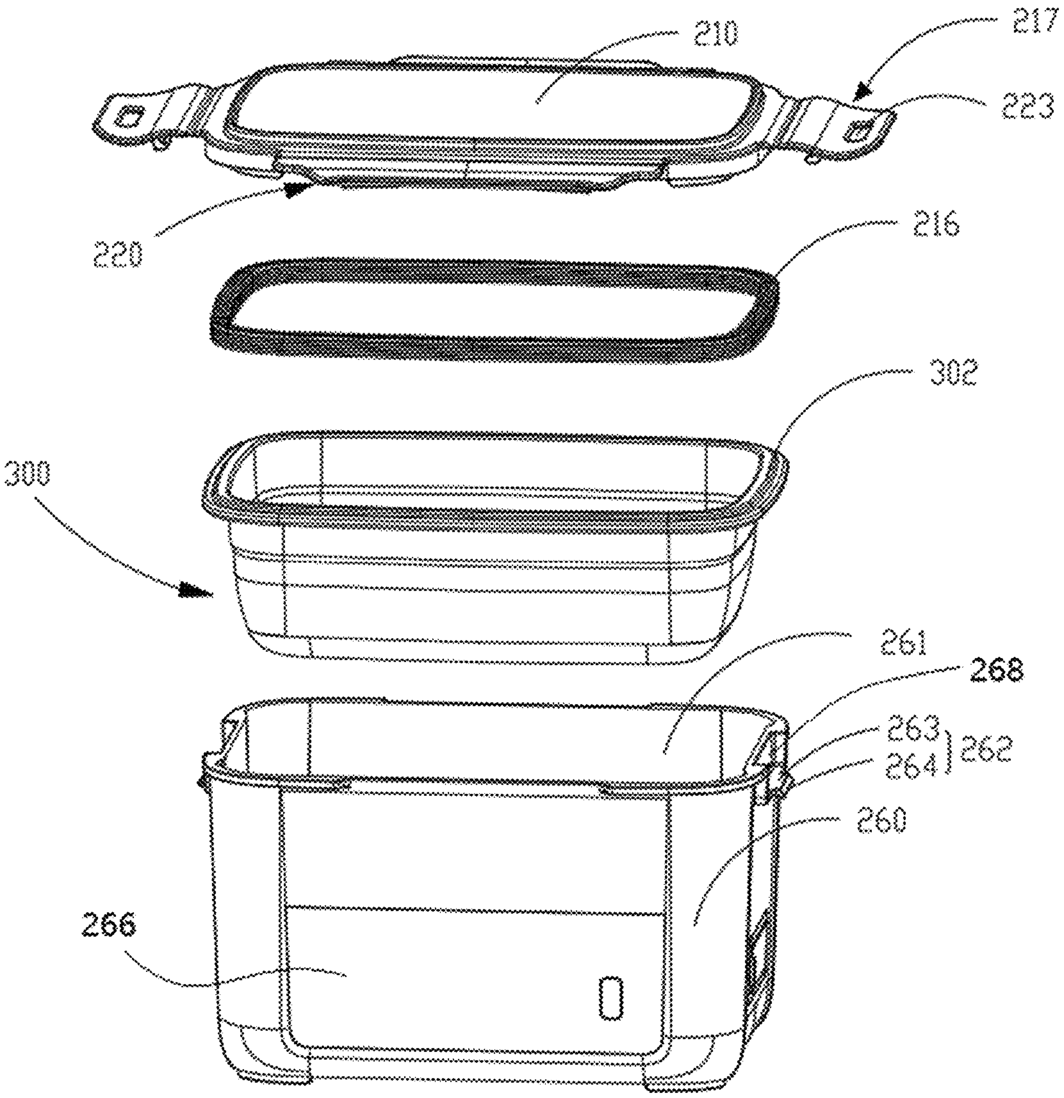
FIG. 8 is an exploded view of a structure of a heating lunch box.
Figure 9:
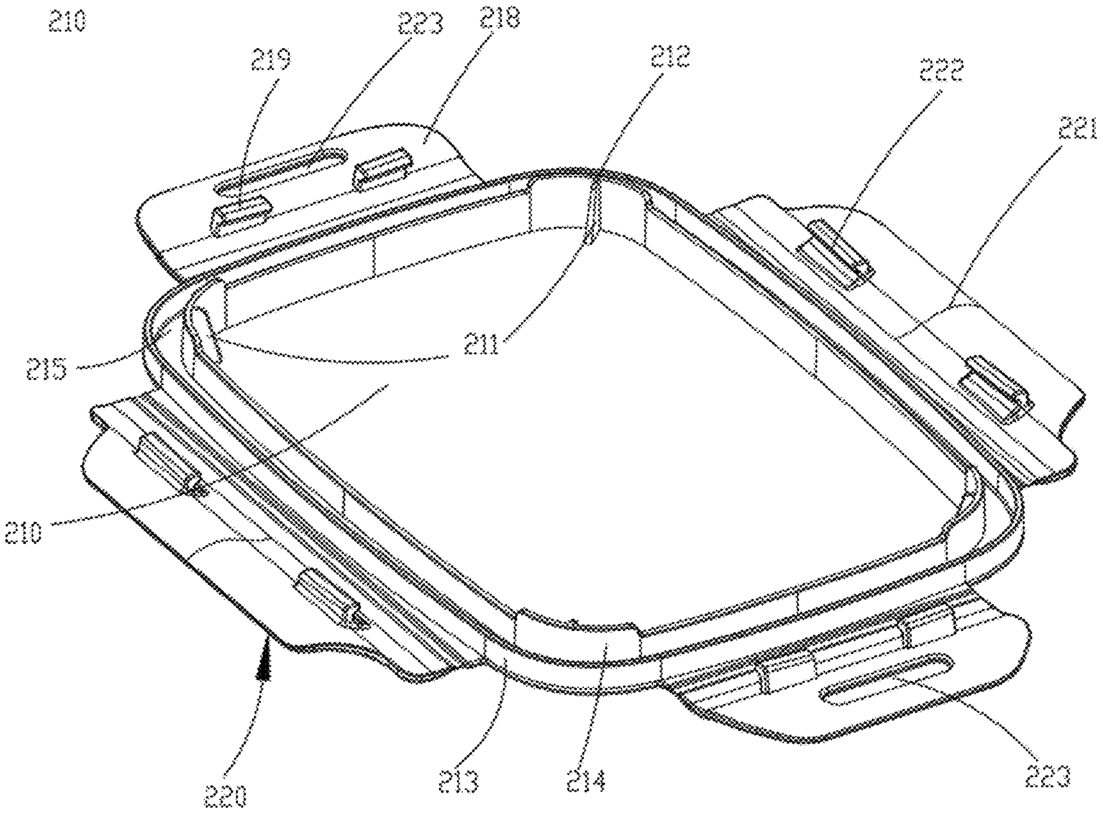
FIG. 9 is a schematic diagram of a structure of an upper cover of a heating lunch box.
Figure 10:
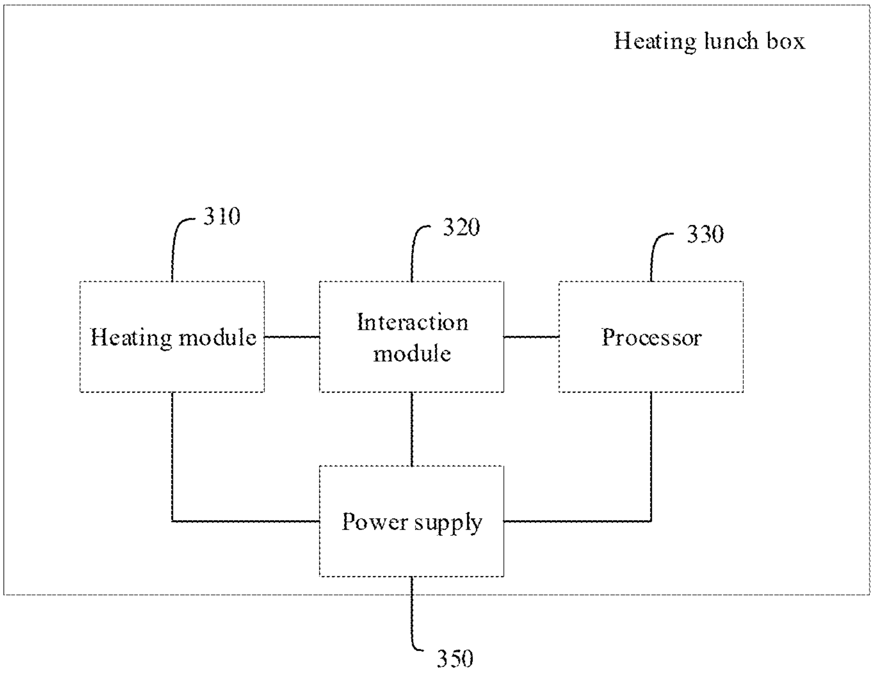
FIG. 10 is a module diagram of a heating lunch box.

Referring to FIG. 1 and FIG. 8, a heating lunch box is provided in an embodiment of the present invention. The heating lunch box includes a food box 300 for accommodating food, a heating module 310 for heating the food box 300, an interaction module 320, and a processor 330 coupled to the heating module 310 and the interaction module 320. The processor 330 is configured for performing the following operations:

S10: obtaining a power-on instruction, in response to the obtained power-on instruction, controlling the interaction module 320 to display an initial interface, and the initial interface at least including a first time setting control 340;

S20: when a trigger event of the first time setting control 340 is detected, controlling the interaction module 320 to display a time selection interface;

S30: obtaining a set time from the time selection interface;

S40: controlling the interaction module 320 to display a heating interface based on the set time; and S50: driving the heating module 310 to heat the food box.

In this embodiment, the heating lunch box is equipped with the interaction module 320, making it convenient for a user to intelligently control the heating lunch box, and improving the intelligence level of the heating lunch box. As an example, the interaction module 320 involved in this embodiment includes a touch screen 266 (see FIG. 8) and a display interface both installed on the heating lunch box. The touch screen 266 is used for the user to operate, forming an instruction or a trigger event based on an operation of the user, controlling the display interface to perform corresponding display, and enhancing the intelligence level of the heating lunch box. The touch screen 266 adopts a capacitive touch technology, can accurately sense a human body touch action, has a multi-point touch function, and can simultaneously identify information such as the position, strength and sliding track of a plurality of touch points, thereby achieving the input of complex instructions such as sliding and selection, and sending the complex instructions to the processor 330. The processor 330 receives the trigger event and performs corresponding processing and control. For example, a touch panel adopts a glass material with high light transmittance, which not only ensures a clear visual effect, but also has good wear resistance and corrosion resistance, and effectively prolongs the service life.

As an example, the interaction module 320 involved in this embodiment includes an interactive mechanical button and a display interface both installed on the heating lunch box. The interactive mechanical button is used for a user to operate, forming an instruction or a trigger event based on an operation of the user, and controlling the display interface to perform corresponding display. Through cooperation of the interactive mechanical button and the display interface, the user is provided with a better service, and user experience satisfaction is improved.

As another example, the interaction module 320 includes a display interface arranged on an intelligent terminal device (such as a smartphone), and/or a display interface arranged on the heating lunch box. The intelligent terminal integrates an application program (APP). A user enters the application program and performs a corresponding operation. The processor 330 forms an instruction or a trigger event based on the operation of the user, and controls the display interface to perform corresponding display, thereby achieving remote control of the heating lunch box.

The display interface uses a high-resolution liquid crystal display (LCD) or an organic light-emitting diode display (OLED), which can present clear and realistic images and text information. Through collaboration with the processor 330 and an image chip, feedback content corresponding to an input instruction of the touch screen can be quickly responded and displayed, including various graphical interfaces, operation prompts, data visualization displays, and the like.

The power-on instruction is used for informing the processor 330 that the heating lunch box has been powered on, and the processor 330 can start working. Specifically, the user clicks a power-on button on the heating lunch box to send the power-on instruction to the processor 330, and the processor 330 obtains the power-on instruction for subsequent processing. The power-on button is a mechanical button on the heating lunch box and is coupled to the processor 330.

The first time setting control 340 is used for setting time. In this embodiment, the first time setting control 340 is used for setting a meal time. Specifically, the user clicks the first time setting control 340 on the initial interface, the processor 330 detects the trigger event of the first time setting control 340, the interaction module 320 is controlled to display the time selection interface, a time selection list is displayed on the time selection interface, and the user selects the meal time from the time selection list and confirms the meal time as the set time. When the processor 330 obtains the set time, the processor 330 controls the interaction module 320 to display the heating interface, and at the same time controls the heating module 310 to heat the food box 300, so that the food is conveniently and quickly heated, and the practicability of the lunch box is improved. In other embodiments, the first time setting control 340 is used for setting the meal time and a heating time. Specifically, the user clicks the first time setting control 340, the processor 330 detects the trigger event of the first time setting control 340, the interaction module 320 is controlled to display the time selection interface, the time selection list is displayed on the time selection interface, and the user selects the meal time from the time selection list and confirms the meal time as the set time. The processor 330 obtains the meal time, calculates a required immediate heating duration based on the meal time, and determines the heating time based on the immediate heating duration and the meal time, that is, subtracting the immediate heating duration from the meal time. Thus, the processor 330 can obtain the meal time and the heating time through the first time setting control 340, and control the interaction module 320 to display, so that the food can be automatically heated when the heating time arrives, and the user can clearly understand the set meal time and heating time, effectively improving the practicality of the lunch box.

In this embodiment, the processor 330 receives the power-on instruction, and controls the interaction module 320 to display the initial interface based on the power-on instruction. The first time setting control 340 of the initial interface reminds the user of the importance of the meal time, allowing the user to operate the first time setting control 340 on the initial interface to generate a trigger event. When the processor 330 receives the trigger event of the first time setting control 340, the interaction module 320 is controlled to display the time selection interface. The user selects time on the selection interface to form the set time, and the processor 330 receives the set time, so that the heating module 310 can be automatically controlled to heat the food box 300, and the user can eat on time without waiting, thereby effectively improving the intelligence of the lunch box, the user experience, and the practicality of the lunch box.

In one embodiment, the heating lunch box can be internally provided with a power supply 350, such as a battery. The battery can be a disposable battery, a rechargeable battery, or any other suitable type of battery, thereby providing power to the heating module 310, the interaction module 320, the processor 330, and the like. In this embodiment, when the heating lunch box is internally provided with the power supply 350, after powering on, the processor 330 also detects a remaining electric quantity of the power supply 350 in real time, and the remaining electric quantity is displayed on the interaction module 320. A specific display method is to display through battery level bars and electric quantity color indicators. For example, when the electric quantity is 100%, a full battery bar is displayed, and the electric quantity is displayed in green. When the electric quantity is 67%-99%, three battery bars are shown, and the electric quantity is displayed in green. When the electric quantity is 66%-34%, two battery bars are shown, and the electric quantity is displayed in yellow. When the electric quantity is 0%-33%, one battery bar is displayed, and the electric quantity is displayed in red. Furthermore, the power supply 350 can be charged by using Type-C charging or solar energy.

In another embodiment, the heating lunch box is powered in a plug-in manner. A power supply device of the heating lunch box is equipped with a plug. By inserting the plug into an external power socket, the connection between the lunch box and the external power supply can be completed, so that the plug-in powering of the lunch box is realized, thereby providing electrical energy for the heating module 310, the interaction module 320, and the processor 330. In this embodiment, the heating module 310 includes, but is not limited to, an electromagnetic heating module, an infrared heating module, an electric heating module, etc., which are not limited here.

Figure 2:
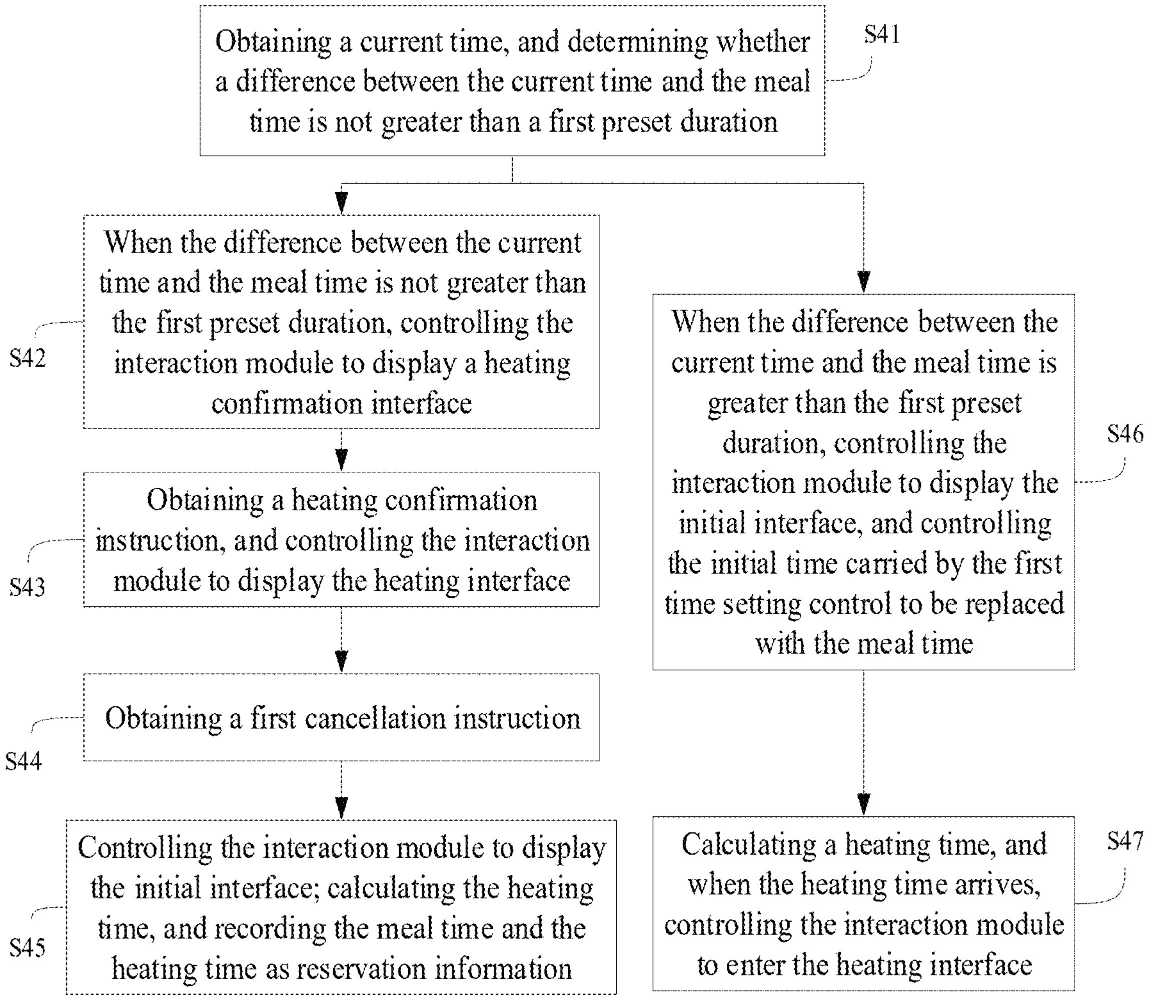
FIG. 2 is a flow diagram of step S40 of the present invention.

Referring to FIG. 2, in one embodiment, the first time setting control 340 carries a state identifier, and in an initial state, a time corresponding to the state identifier is an initial time.

The step S40 of "controlling the interaction module 320 to display a heating interface based on the set time" includes:

S41: obtaining a current time, and determining whether a difference between the current time and the meal time is not greater than a first preset duration;

S42: when the difference between the current time and the meal time is not greater than the first preset duration, controlling the interaction module 320 to display a heating confirmation interface;

S43: based on the heating confirmation interface, obtaining a heating confirmation instruction, and in response to the obtained heating confirmation instruction, controlling the interaction module 320 to display the heating interface;

S44: based on the heating confirmation interface, obtaining a first cancellation instruction;

S45: based on the first cancellation instruction, controlling the interaction module 320 to display the initial interface; calculating the heating time based on the meal time, and recording the meal time and the heating time as reservation information;

S46: when the difference between the current time and the meal time is greater than the first preset duration, controlling the interaction module 320 to display the initial interface, and controlling the initial time carried by the first time setting control 340 to be replaced with the meal time; and S47: calculating a heating time based on the meal time, and when the heating time arrives, controlling the interaction module 320 to enter the heating interface.

In this embodiment, the first preset duration is a preset duration, which can be set according to the an actual situation. For example, the first preset duration is 1 hour, and of course, the first preset duration can also be 40 minutes. The initial time is a preset time, and during the initial time, the processor 330 will not control the heating module 310 to heat, thereby improving the safety of the heating lunch box. In this embodiment, the immediate heating duration is stored in the processor 330. When the processor 330 obtains the meal time, the heating time is obtained by subtracting the immediate heating duration from the meal time.

The initial state can be a corresponding state when the heating lunch box is not in use, or can be a state after the heating lunch box is restored to its factory settings. In the initial state, the time corresponding to the state identifier is the initial time, indicating that the heating lunch box is not in a heating state and cannot be heated. By setting the state identifier, it is ensured that the heating lunch box does not work in this initial state to avoid accidents. At the same time, the importance of the first time setting control 340 is highlighted, and the user is reminded to operate the first time setting control 340 to heat food. For example, the state identifier is 00:00. Specifically, 00:00 is displayed above the first time setting control 340. In other embodiments, the state identifier can also use highlighted text or icons to highlight the first time setting control 340, etc., which is not limited here. In other embodiments, in a non-initial state, when entering the initial interface, a time corresponding to the state identifier carried by the first time setting control 340 is the meal time, and the user does not need to repeatedly set the meal time.

In this embodiment, the processor 330 compares the current time with the meal time. If the difference between the current time and the meal time is not greater than the first preset duration, it indicates that an interval between the current time and the meal time is short, and immediate heating is required. However, in order to avoid insufficient heating time, the processor 330 controls the interaction module 320 to display the heating confirmation interface. The user can click a confirmation button based on an actual situation. When the processor 330 obtains the heating confirmation instruction, the processor 330 controls the interaction module 320 to display the heating interface, i.e., step S43, to control the heating module 310 to heat. If the heating time is insufficient, the user can click a cancellation button to generate a first cancellation instruction. When the processor 330 receives the first cancellation instruction, the processor 330 controls the interaction module 320 to display the initial interface. Moreover, the processor 330 also calculates the heating time based on the meal time, and records the meal time and the heating time as reservation information, so that the heating lunch box can automatically heat according to the reservation information after subsequent power-on, thereby providing convenience to the user. It is understandable that with the reservation information, in subsequent operations, after powering on, the interaction module 320 enters a power-on interface, and the processor 330 queries the reservation information and compares the meal time of the reservation information with a power-on time. If the power-on time is after the heating time and before the meal time, the processor 330 controls the interaction module 320 to display the heating confirmation interface, allowing the user to further select a corresponding operation. When the difference between the current time and the meal time is greater than the first preset duration, it indicates that the interval between the current time and the meal time is long. If heating is started immediately, subsequent heat preservation may be required, which wastes power. Therefore, the processor 330 controls the interaction interface to jump to the initial interface, and replaces the initial time on the initial interface with the meal time, allowing the user to clearly understand that the setting is successful. When the heating time arrives, the processor 330 controls the interaction module 320 to display the heating interface, achieving a user-friendly setup and saving power.

Figure 3:
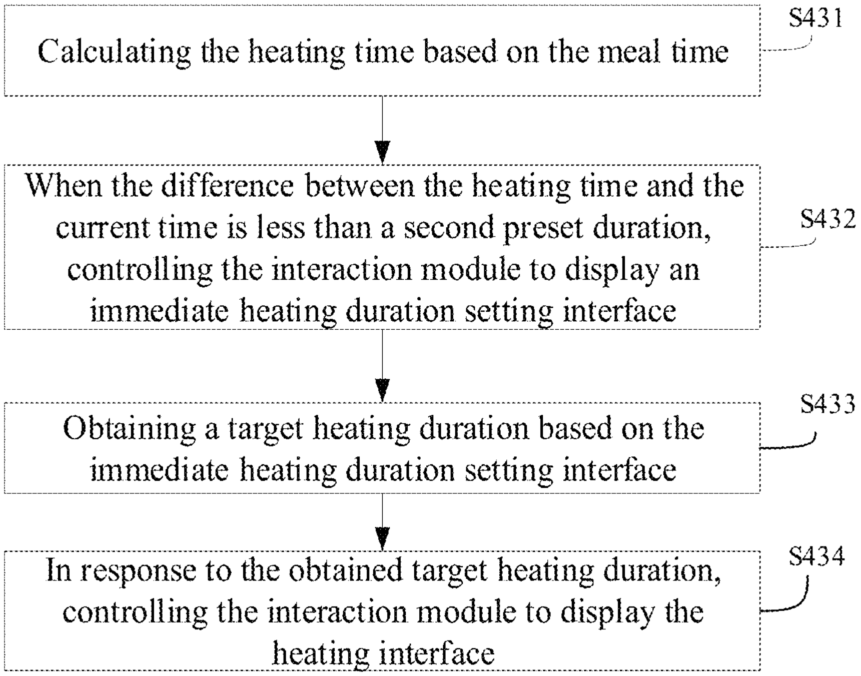
FIG. 3 is a flow diagram of step S43 of the present invention.

Referring to FIG. 3, in one embodiment, in step S42, the difference between the current time and the meal time is not greater than the first preset duration, so that the immediate heating duration may be insufficient. At this time, if the user still wants to eat, the step S43 of "based on the heating confirmation interface, obtaining a heating confirmation instruction, and in response to the obtained heating confirmation instruction, controlling the interaction module 320 to display the heating interface" includes:

- S431: calculating the heating time based on the meal time;
- S432: when the difference between the heating time and the current time is less than a second preset duration, controlling the interaction module 320 to display an immediate heating duration setting interface;
- S433: obtaining a target heating duration based on the immediate heating duration setting interface; and
- S434: in response to the obtained target heating duration, controlling the interaction module 320 to display the heating interface.

In this embodiment, the processor 330 calculates the heating time based on the meal time. When the difference between the heating time and the current time is less than the second preset duration, where the second preset duration equals a preset immediate heating duration, to avoid insufficient heating time, the interaction module 320 is controlled to display the immediate heating duration setting interface. The user operates on the immediate heating duration setting interface to generate the target heating duration required by the user. When the processor 330 receives the target heating duration, the processor 330 controls the interaction module 320 to display the heating interface and controls the heating module 310 to heat, thereby ensuring sufficient heating duration and further improving the practicality of the heating lunch box. It should be noted that the processor 330 stores the immediate heating duration. After obtaining the meal time, the processor 330 calculates the heating time using the immediate heating duration. The user can modify the immediate heating duration according to the user's own need.

As an embodiment, the immediate heating duration setting interface involved in the step S433 carries a control progress bar. The control progress bar carries a lower limit heating duration and an upper limit heating duration. A sliding displacement of the control progress bar is detected to obtain the target heating duration, and the target heating duration is between the lower limit heating duration and the upper limit heating duration. The user drags the progress bar on the interaction module 320 to select the target heating duration. The processor 330 detects the sliding displacement of the control progress bar, determines the immediate heating duration corresponding to the sliding displacement as the target heating duration, and control the heating module 310 to heat the food box 300 according to the target heating duration. The lower limit heating duration is the shortest heating duration, and the upper limit heating duration is the longest heating duration. By setting the lower limit heating duration and the upper limit heating duration, it is convenient for the user to understand an appropriate immediate heating duration and choose from it, so as to ensure that the food tastes good after heating, and the practicability of the heating lunch box is high.

As an embodiment, the heating lunch box further includes a reminder component coupled to the processor 330. When controlling the heating module 310 to heat the food box 300, the processor 330 obtains a real-time heating temperature, controls the heating interface to display the real-time heating temperature, and controls the reminder component to generate a heating reminder signal. The reminder component is a signal light component, and the heating reminder signal is that a light is always on.

In this embodiment, the heating lunch box is also equipped with a temperature sensor coupled to the processor 330. The processor 330 controls the heating module 310 to start heating. The heating module 310 is a heating panel, and the temperature sensor is installed at a bottom portion of the heating panel to detect a real-time heating temperature of the heating panel and send the real-time heating temperature to the processor 330. The processor 330 receives the real-time heating temperature and controls the interaction module 320 to display the real-time heating temperature on the heating interface. At the same time, the reminder component is controlled to generate the heating reminder signal, so that the user can intuitively perceive a working state of the heating lunch box. In this embodiment, the reminder component is a signal light component, and the processor 330 controls the signal light component to generate an always-on light signal. Preferably, the signal light component is a red light, and the processor 330 controls the red light to be always on, which can provide a more noticeable reminder to the user.

As an embodiment, after a duration of controlling the heating module 310 to heat the food box 300 is greater than a third preset duration, the interaction module 320 is controlled to enter a screen-off state. In this embodiment, the third preset duration can be 30 seconds. After the heating interface of the interaction module 320 is displayed for 30 seconds, an interface of the interaction module 320 turns off. This further saves power.

Referring to FIG. 1, in one embodiment, after the step S40 of "controlling the interaction module 320 to display a heating interface", the processor 330 is configured for performing the following operations:

- S60: obtaining a second cancellation instruction based on the heating interface;

S70: in response to the obtained second cancellation instruction, controlling the interaction module 320 to display a heating canceling pop-up window;

S80: obtaining a cancellation confirming instruction based on the heating canceling pop-up window;

S90: in response to the obtained cancellation confirming instruction, controlling the interaction module 320 to display the initial interface;

or,

S100: after the operation of "controlling the interaction module 320 to display a heating canceling pop-up window", obtaining a power-off instruction, and in response to the obtained power-off instruction, controlling the heating lunch box to be powered off.

In this embodiment, after the interaction module 320 displays the heating interface, if the user temporarily does not want to heat the food, the heating interface is equipped with a return button, the user clicks the return button, and the processor 330 receives the second cancellation instruction. In response to the obtained second cancellation instruction, the interaction module 320 is controlled to display the heating canceling pop-up window, allowing the user to confirm whether to further cancel the heating, thereby avoiding an error operation. The user clicks the cancellation button on the heating canceling pop-up window to generate the cancellation confirming instruction, i.e., the step S80. The processor 330 receives the cancellation confirming instruction and controls the interaction module 320 to display the initial interface, allowing the user to perform subsequent operations on the initial interface. Of course, after the interaction module 320 displays the heating canceling pop-up window, the user can also press a power-off button to send the power-off instruction to the processor 330. After the processor 330 receives the power-off instruction, the processor 330 controls the heating lunch box to be powered off. In this embodiment, specifically, the processor 330 obtains a first power-off signal formed by the power-off button being pressed for a first pressing duration, and obtains a second power-off signal formed by the power-off button being pressed for a second pressing duration. When the first power-off signal and the second power-off signal are received, the power-off instruction is confirmed to be received. The first pressing duration is not equal to the second pressing duration. In this embodiment, the first pressing duration can be greater than the second pressing duration, or vice versa, which is not limited here. When the processor 330 detects that the user presses the power-off button twice, and the duration of the two presses is not equal, the user can be prevented from mistakenly touching the power-off button.

Figure 4:
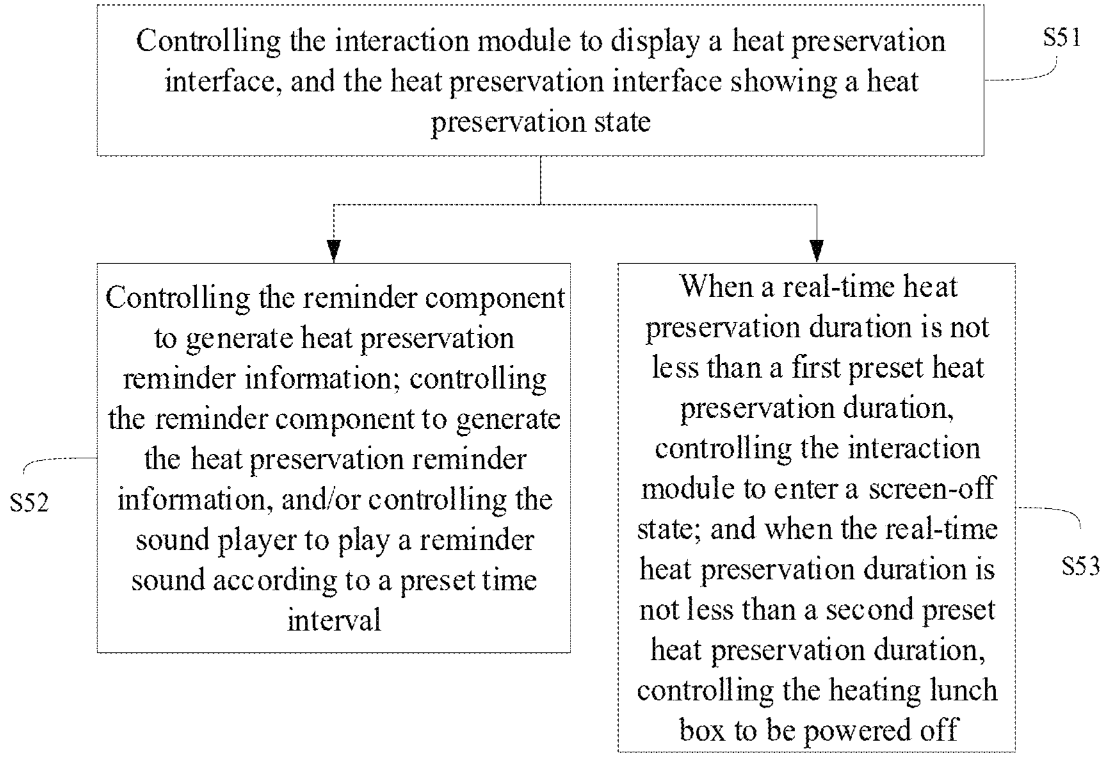
FIG. 4 is a flow diagram of step S50 of the present invention.

Referring to FIG. 4, as an embodiment, the heating lunch box further includes a reminder component coupled to the processor 330.

After the step S50, that is, after controlling the heating module 310 to heat the food box 300, the processor 330 is configured for performing the following operations:

S51: when heating is detected to be completed, controlling the interaction module 320 to display a heat preservation interface, and the heat preservation interface showing a heat preservation state; and

S52: controlling the reminder component to generate heat preservation reminder information, wherein the reminder component includes at least one of a signal light component and a sound player; controlling the reminder component to generate the heat preservation reminder information, including controlling the signal light component to generate a breathing signal, and/or controlling the sound player to play a reminder sound according to a preset time interval.

In this embodiment, after heating is completed, i.e., after the immediate heating duration is completed, the processor 330 controls the interaction module 320 to display the heat preservation interface. The heat preservation interface can display a text identifier of being in heat preservation, allowing the user to intuitively know that the food heating is complete. At the same time, the reminder component is controlled to generate the heat preservation reminder information. The reminder component is at least one of the signal light component or the sound player. When the signal light component is controlled to generate the breathing signal, in this embodiment, the signal light component is a red light, and the breathing signal is that the red light gradually brightens for one second and then gradually dims for one second. The sound player is controlled to play the reminder sound according to the preset time interval. Specifically, a "ding" sound can be produced, and the reminder is repeated every preset time interval.

Referring to FIG. 4, as an embodiment, after the step S51, i.e., after "controlling the interaction module 320 to display a heat preservation interface, and the heat preservation interface showing a heat preservation state", the processor 330 is configured for performing the following operations:

S53: detecting a real-time heat preservation duration, and when the real-time heat preservation duration is not less than a first preset heat preservation duration, controlling the interaction module 320 to enter a screen-off state; and when the real-time heat preservation duration is not less than a second preset heat preservation duration, controlling the heating lunch box to be powered off. The first preset heat preservation duration is less than the second preset heat preservation duration.

In this embodiment, the processor 330 also records the real-time heat preservation duration of the heat preservation interface. When the real-time heat preservation duration is greater than the first preset heat preservation duration, the interaction module 320 is controlled to enter the screen-off state. When the real-time heat preservation duration is not less than the second preset heat preservation duration, the heating lunch box is controlled to be powered off, thereby avoiding waste of electric energy, and also protecting the power supply of the battery.

Figure 5:
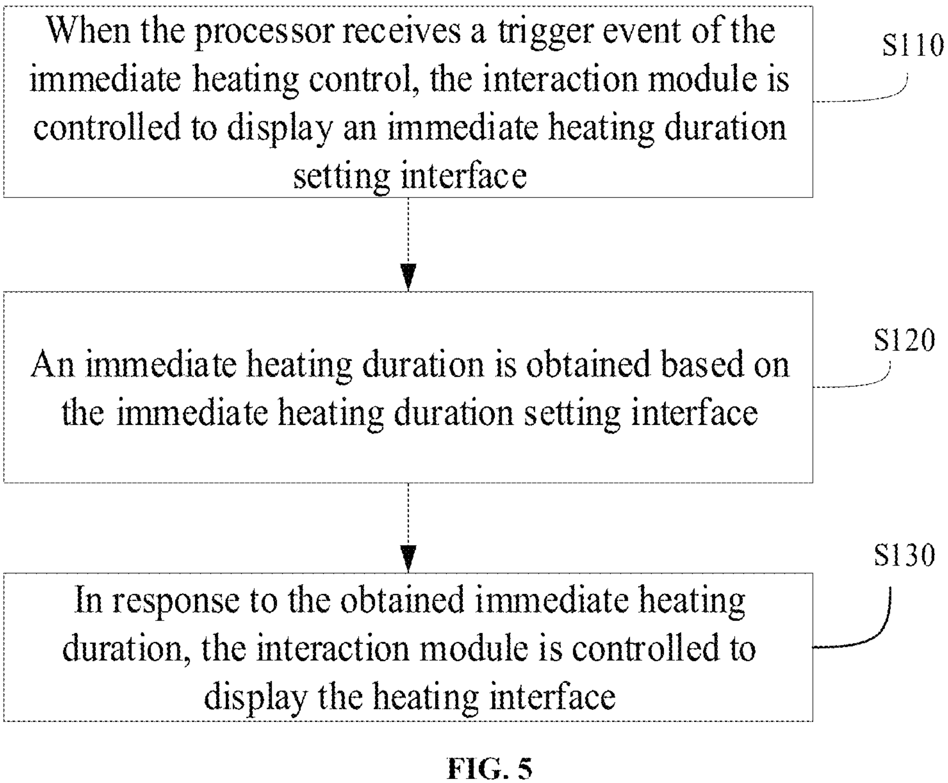
FIG. 5 is a flow diagram after step S10 of the present invention.

Referring to FIG. 5, as an embodiment, the initial interface also includes an immediate heating control;

S110: when the processor 330 receives a trigger event of the immediate heating control, the interaction module 320 is controlled to display an immediate heating duration setting interface;

S120: an immediate heating duration is obtained based on the immediate heating duration setting interface; and

S130: in response to the obtained immediate heating duration, the interaction module 320 is controlled to display the heating interface.

In this embodiment, the user can also directly control the heating lunch box to heat the food through the immediate heating control of the initial interface. Specifically, when the user clicks the immediate heating control of the initial interface, the processor 330 receives the trigger event of the immediate heating control and controls the interaction module 320 to display the immediate heating duration setting interface. The immediate heating duration setting interface is provided with an immediate heating duration progress bar. The immediate heating duration progress bar includes a lower limit heating duration and an upper limit heating duration. The user can drag the immediate heating duration progress bar to select an immediate heating duration. The processor 330 receives a sliding displacement of the immediate heating duration progress bar to confirm the immediate heating duration. When the immediate heating duration is reached, the interaction module 320 is controlled to display the heating interface, and the heating module 310 is controlled to heat according to the immediate heating duration. In this embodiment, when the interaction module 320 enters the screen-off state, the interaction interface is locked. It is necessary to press the power-on/power-off button briefly to light up the screen, and then swipe the screen to unlock before the user can perform the operation again.

As an embodiment, the initial interface also includes a setting control.

When a trigger event of the setting control is received, the interaction module 320 is controlled to display a setting interface. The setting interface includes at least one of a reservation mode control, a current time setting control, a temperature adjustment control, a unit adjustment control, a language adjustment control, a sound adjustment control, and a factory setting restoration control.

In this embodiment, when the user clicks on the setting control of the initial interface, the processor 330 receives the trigger event of the setting control and controls the interaction module 320 to display the setting interface. The user can click on at least one of the reservation mode control, the current time setting control, the temperature adjustment control, the unit adjustment control, the language adjustment control, the sound adjustment control, and the factory setting restoration control on the setting interface for setting, so that the heating lunch box can better provide personalized services for the user.

Specifically, when a trigger event of the reservation mode control is received, the processor 330 controls the interaction module 320 to display a reservation mode interface. A reservation heating duration is obtained based on the reservation mode interface. The reservation mode interface includes a lower limit heating duration and an upper limit heating duration. The reservation heating duration is between the lower limit heating duration and the upper limit heating duration. The user can select the reservation heating duration from the reservation mode interface in advance, and the reservation heating duration is between the lower limit heating duration and the upper limit heating duration. The heating can be performed at an appropriate heating duration to ensure a better taste of the food.

When a trigger event of the current time setting control is received, the processor 330 controls the interaction module 320 to display a time selection interface. The time selection interface displays a time selection list, and a current time is obtained based on the time selection list. In this embodiment, the user can select the current time through the time selection list to ensure the subsequent accuracy of time of the heating lunch box.

When a trigger event of the temperature adjustment control is received, the interaction module 320 is controlled to display a temperature adjustment interface. The temperature adjustment interface includes a temperature progress bar. The temperature progress bar includes an upper limit heating temperature and a lower limit heating temperature. A heating parameter is obtained based on the temperature progress bar, a target heating temperature is obtained based on the heating parameter, the heating module 310 is controlled to heat according to the target heating temperature, and the target heating temperature is between the upper limit heating temperature and the lower limit heating temperature. In this embodiment, the user can select the heating temperature through the temperature progress bar on the temperature adjustment interface to ensure that the user can choose different heating temperatures according to the food, thereby ensuring better food taste.

When a trigger event of the unit adjustment control is received, the interaction module 320 is controlled to display a unit system switching interface. The unit system switching interface includes a temperature unit switching control and a time unit switching control. When the temperature unit switching control is triggered, a temperature unit of the interaction module 320 is controlled to be switched. When the time unit switching control is triggered, a time unit of the interaction module 320 is controlled to be switched. In this embodiment, the temperature unit switching control facilitates the user to switch between a Celsius unit and a Fahrenheit unit of temperature. The time unit switching control facilitates the user to switch between a 12-hour time system and a 24-hour time system. Therefore, usage needs of different users are met, and the applicable population of the heating lunch box is increased.

When a trigger event of the language adjustment control is received, the interaction module 320 is controlled to display a language selection list. Based on the language selection list, a target language is obtained, and a text of the interaction module 320 is controlled to be displayed according to the target language. In this embodiment, the user selects the target language from the language selection list and clicks a restart confirming button. When the processor 330 receives the target language and a restart confirming signal, the heating lunch box restarts. After the restart, all text in the interaction module 320 is controlled to be displayed in the target language.

When a trigger event of the sound adjustment control is received, the interaction module 320 is controlled to display a sound adjustment interface. The sound adjustment interface includes a sound adjustment progress bar. A volume adjustment parameter is obtained based on the sound adjustment progress bar. A volume corresponding to the volume adjustment parameter is determined as a target volume. The sound player and the interaction module 320 are controlled to play according to the target volume. In this embodiment, the user drags the progress bar on the interactive interface, and the volume adjustment parameter is formed in the process of dragging the progress bar and is sent to a controller, so that the controller determines the final target volume.

When a trigger event of the factory setting restoration control is received, the interaction module 320 is controlled to display a factory setting restoration interface, a factory setting restoration instruction is obtained based on the factory setting restoration interface, and the interaction module 320 is restored to a factory setting.

As an embodiment, in response to a sliding displacement of the sound adjustment progress bar, the interaction module 320 is controlled to play a corresponding volume. When the sliding displacement of the sound adjustment progress bar is zero, a sound icon of the interaction module 320 is controlled to be a mute icon. When the sliding displacement of the sound adjustment progress bar is not zero, the sound icon of the interaction module 320 is controlled to be a sound wave icon. In this embodiment, a volume setting of the heating lunch box can be effectively determined for the user through the mute icon and the sound wave icon. In this embodiment, the user drags the sound adjustment progress bar, and at the same time the processor 330 controls the interaction module 320 to play a corresponding volume, making it easier for the user to perceive the volume and select a desired volume.

Figure 6:
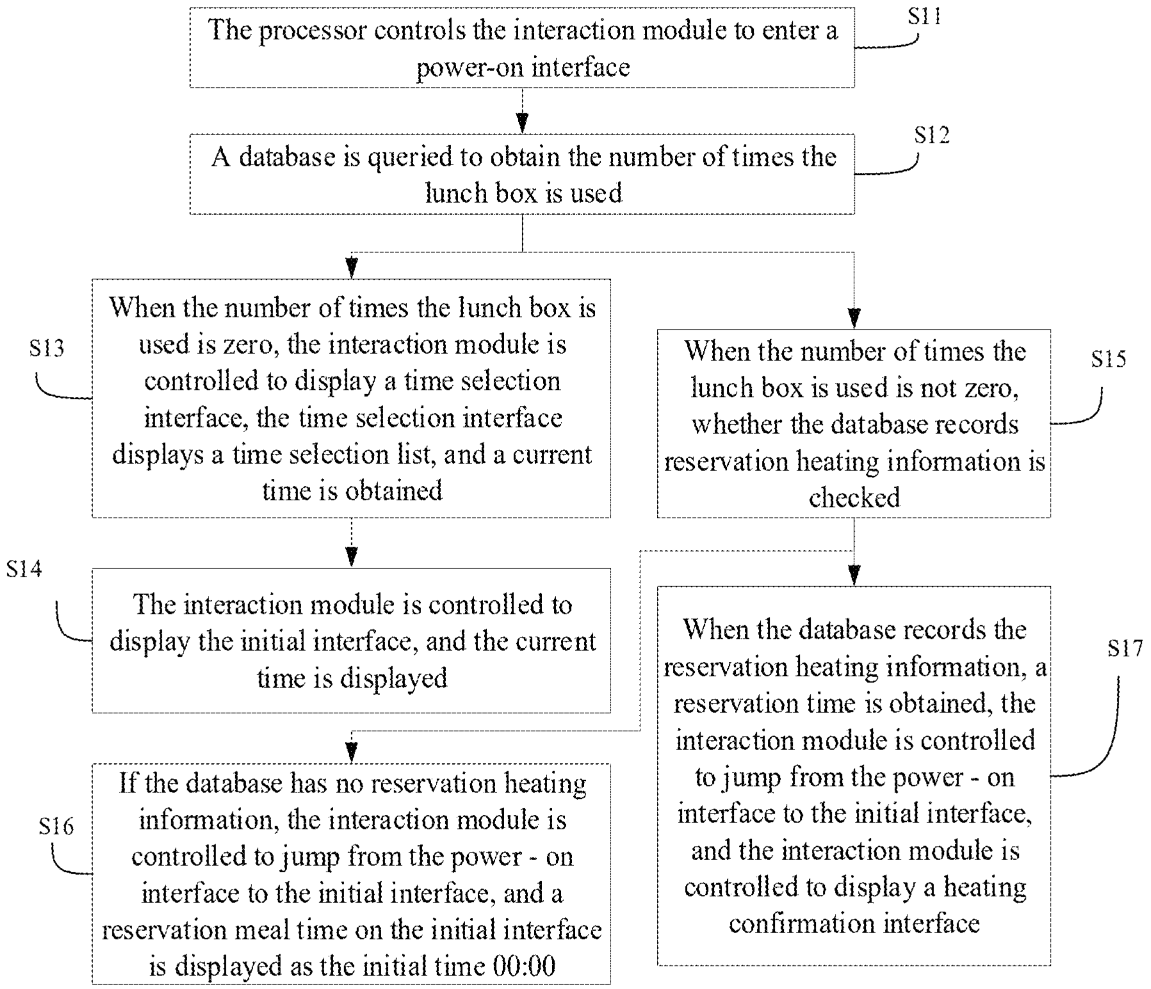
FIG. 6 is a flow diagram in step S10 of the present invention.
Figure 7:
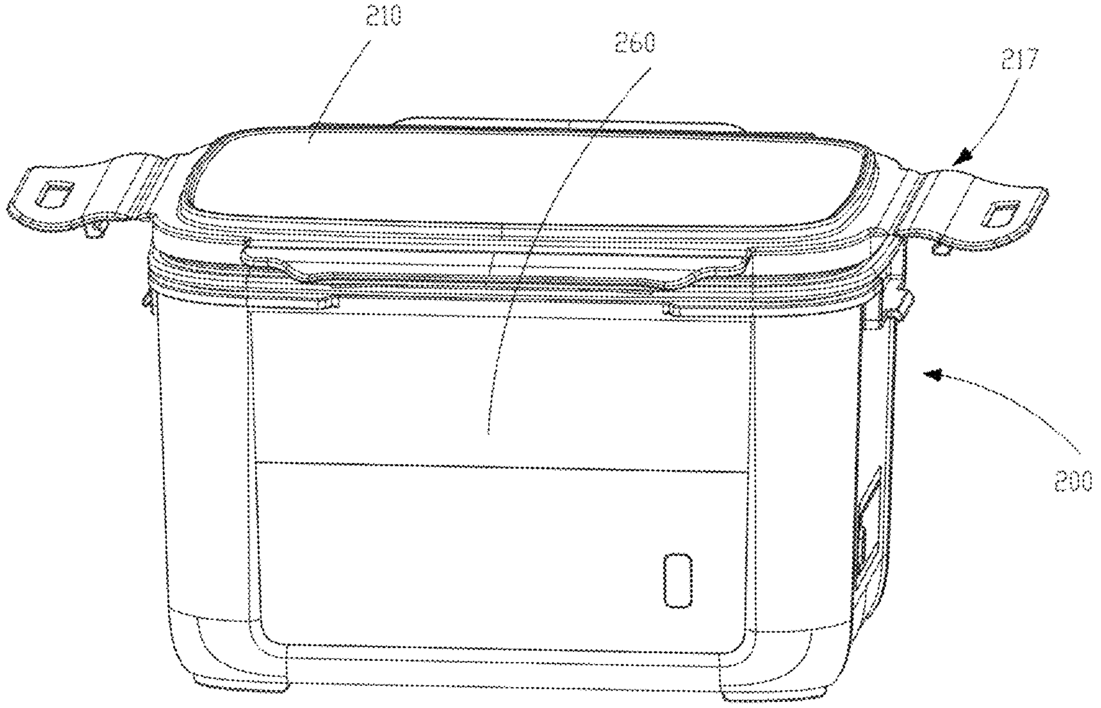
FIG. 7 is a schematic diagram of a structure of a heating lunch box.

Referring to FIG. 6, as an embodiment, after "obtaining a power-on instruction" in the step S10, and before "in response to the obtained power-on instruction, controlling the interaction module 320 to display an initial interface" in the step S10,

- S11: the processor 330 controls the interaction module 320 to enter a power-on interface;
- S12: a database is queried to obtain the number of times the lunch box is used;
- S13: when the number of times the lunch box is used is zero, the interaction module 320 is controlled to display a time selection interface, the time selection interface displays a time selection list, and a current time is obtained based on the time selection list;
- S14: when the current time is obtained, the interaction module 320 is controlled to display the initial interface, and the current time is displayed.
- S15: when the number of times the lunch box is used is not zero, whether the database records reservation heating information is checked;
- S16: if the database has no reservation heating information, the interaction module 320 is controlled to jump from the power-on interface to the initial interface, and a reservation meal time on the initial interface is displayed as the initial time 00:00; and
- S17: when the database records the reservation heating information, a reservation time is obtained, the interaction module is controlled to jump from the power-on interface to the initial interface, the reservation meal time on the initial interface is displayed as a reservation meal time set by a user, and the interaction module is controlled to display a heating confirmation interface based on a reservation heating time.

In this embodiment, after the processor 330 obtains the power-on instruction, if the number of times the lunch box is used is zero, the processor 330 controls the interaction module 320 to display the time selection interface for the user to select the current time. When the number of times the lunch box is used is not zero but there is no reservation information, the interaction module 320 is controlled to display the initial interface, making it convenient for the user to select the meal time and other operations. When the number of times the lunch box is used is not zero, but there is reservation information, the heating time is obtained from the reservation time, and the interaction module 320 is controlled to display the heating confirmation interface for quick heating.

As an embodiment, step S10, that is, obtaining a power-on instruction, includes: obtaining a first power-on signal and a second power-on signal, and based on the first power-on signal and the second power-on signal, determining that the power-on instruction has been obtained.

In this embodiment, the processor 330 only confirms receipt of the power-on instruction upon receiving the first power-on signal and the second power-on signal, thereby avoiding the user from accidentally touching the heating lunch box and performing an error operation.

Specifically, the heating lunch box is equipped with a power-on button coupled to the processor 330. The processor 330 obtains the first power-on signal formed by the power-on button being pressed for the first pressing duration, and obtains the second power-on signal formed by the power-on button being pressed for the second pressing duration. The first pressing duration and the second pressing duration are not equal.

In this embodiment, the first pressing duration can be greater than the second pressing duration, and vice versa, which is not limited here. When the processor 330 detects that the user has pressed the power-on button twice and the duration of the two presses is not equal, the user can be prevented from accidentally touching the power-on button. In this embodiment, the power-on button and the power-off button can be an identical mechanical button.

In one embodiment, the processor 330 is also used for monitoring a screen-on duration of the interaction module 320. When the screen-on duration is greater than a third preset duration and no instruction is received, the interaction module 320 is controlled to enter a screen-off state. When the interaction module 320 displays an interface that can be operated by the user, the processor 330 monitors the screen-on duration of the interaction module 320 in real time. When the screen-on duration is greater than the third preset duration and no instruction is received, the interaction module 320 is controlled to enter the screen-off state, which is beneficial to saving power.

The sequence numbers of the foregoing embodiments of the present invention are merely for description, and do not represent the advantages and disadvantages of the embodiments. In addition, although a logical order is shown in the flow diagrams, in some cases, the steps shown or described may be performed in an order different from that described herein.

In one embodiment, the processor 330 can be one or more, and the processor 330 is configured for performing the above heating steps. The processor 330 can be a Central Processing Unit (CPU), other general-purpose processors, a Digital Signal Processor (DSP), etc. The general-purpose processor can be a microprocessor, or the processor 330 can also be any conventional processor or the like.

Figure 11:
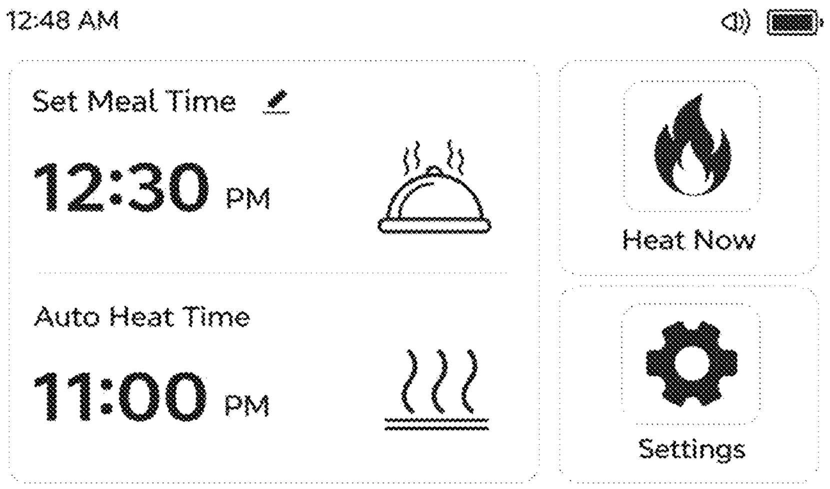
FIG. 11 is a diagram of an initial interface of a heating lunch box.
Figure 12:
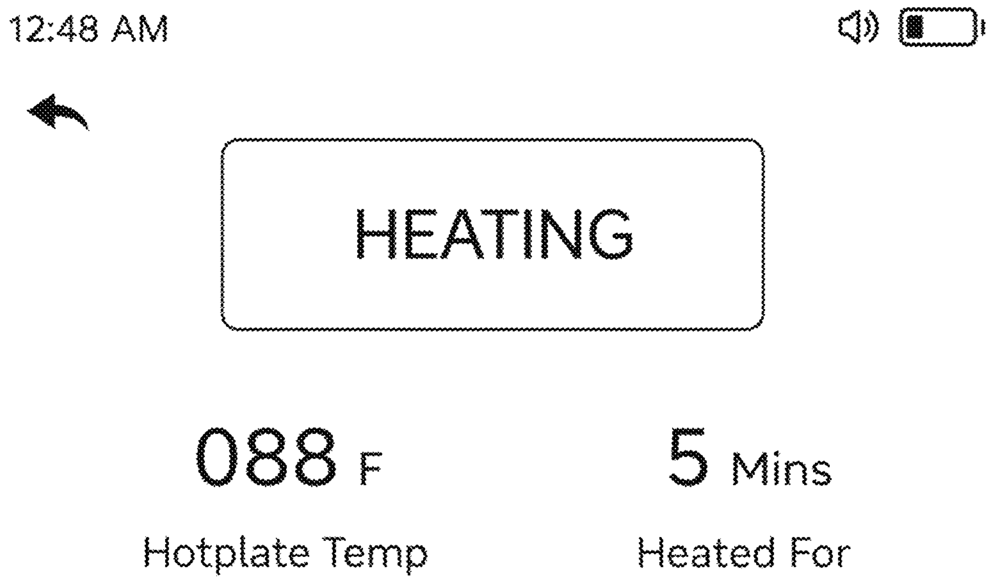
FIG. 12 is a diagram of a heating interface of a heating lunch box.
Figure 13:
FIG. 13 is an interface diagram for setting a heating time of a heating lunch box.

Referring to FIGS. 7-10, as an embodiment, the heating lunch box further includes a shell 200. The shell 200 includes an upper cover 210 and a base 260. The power supply 350, the heating module 310, and the processor 330 may be mounted in a lower portion of the base 260. The heating lunch box further includes a touch display screen 266 arranged in the base 260 and exposed at a front side of the base 260. The touch display screen 266 is configured to display a heating setting interface for receiving at least one heating setting instruction input by users and display a heating interface including heating time related information, such as shown by FIGS. 11-13.

An upper portion of the base 260 is provided with an accommodating cavity 261 for accommodating a food box 300. The upper cover 210 is used for covering the base 260 and the food box 300. The upper cover 210 is equipped with a positioning component 211. The positioning component 211 is used for limiting a position of the food box 300, so that the food box 300 is placed on the upper cover 210. The positioning component 211 includes at least two positioning members 212 formed by an inner wall of the upper cover 210 extending along a direction of the base 260. At least two of the positioning members 212 are symmetrically arranged. At least two of the positioning members 212 are used for abutting against an outer wall of the food box 300. In this embodiment, a periphery of the upper cover 210 is equipped with an outer sealing ring 213 extending upwards and an inner sealing ring 214 opposite to the outer sealing ring 213. A sealing groove 215 is formed between the outer sealing ring 213 and the inner sealing ring 214. The sealing groove 215 is used for receiving a sealing member 216. The inner sealing ring 214 and a surface of the upper cover 210 form a groove. The positioning member 212 is installed on the inner sealing ring 214 and abuts against the outer wall of the food box 300, so that the upper cover 210 can be used as a tray for the food box 300 for the placement of the food box 300, and the positioning member 212 abuts against the food box 300 to prevent the food box 300 from moving. Furthermore, the positioning member 212 is arranged in a trapezoidal shape.

As an embodiment, the base 260 is provided with a clasp member 262. The upper cover 210 comprises a pair of first fastening component 217. An opening edge of the food box 300 extends outward to form a convex edge 302. The convex edge 302 cooperates with the first fastening component 217 to fasten the food box 300 and the upper cover 210. The clasp member 262 cooperates with the pair of first fastening components 217 to fasten the base 260 and the upper cover 210.

The first fastening component 217 includes a first fastening plate 218 and a first fastening member 219. The first fastening plate 218 is foldable relative to the upper cover 210. The first fastening member 219 is arranged on the first fastening plate 218. The first fastening member 219 is L-shaped. The convex edge 302 is configured to be fastened with the first fastening member 219, so that the food box 300 and the upper cover 210 are fastened.

The first fastening component 217 includes a through hole 223 defined in the first fastening plate 218. The clasp member 262 includes a first flange 263 arranged on an outer wall of the base 260 and a barb portion 264 connected to a free end of the first flange 263. The barb portion 264 is used for penetrating the through hole 223, so that the base 260 and the upper cover 210 are fastened. As illustrated by FIG. 8, a recess groove 268 is defined in an outside of the base 260. When the first fastening component 217 is securely engaged with the clasp member 262, the first fastening component 217 is accommodated in the recess groove 268. The clasp member 262 is located at a bottom of the recess groove 268, and extends outwardly from the bottom in a direction away from the recess groove 268.

In this embodiment, a total number of the clasp member 262 is two, and a total number of the first fastening components 217 is two. The two clasp members 262 are symmetrically arranged on both sides of the base 260. The two first fastening components 217 are symmetrically arranged on both sides of the upper cover 210. The upper cover 210 is rectangular in shape. Therefore, the third fastening component and the first fastening component 217 are arranged on adjacent sides of the upper cover 210, and the first fastening component 217 and the clasp member 262 are correspondingly arranged to ensure covering. The through hole 223 and the first fastening member 219 are both position on the first fastening plate 218. The through hole 223 cooperates with the clasp member 262 to fasten the upper cover 210 and the base 260, and the first fastening member 219 cooperates with the convex edge 302 to fasten the upper cover 210 and the food box 300, which is conducive to tight fastening and can effectively avoid a problem of liquid leakage of the food box 300. During covering, the convex edge 302 of the food box 300 is placed on the base 260, and liquid will not enter the accommodating cavity 261. Compared with existing lunch boxes, the structure is simpler and more practical.

Furthermore, the upper cover 210 is equipped with a second fastening component 220. The third fastening component cooperates with the second fastening component 220, so that the food box 300 and the upper cover 210 are fastened. The second fastening component 220 includes a second fastening plate 221 and a second fastening member 222. The second fastening plate 221 is foldable relative to the upper cover 210. The second fastening member 222 is arranged on the second fastening plate 221. A cross-section of the second fastening member 222 is U-shaped to cooperate with the convex edge 302, so that the food box 300 and the upper cover 210 are fastened. By providing the second fastening component 220, it can be ensured that the upper cover 210 and the food box 300 are fastened more tightly.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

What is claimed is:

1. A heating lunch box, comprising:

a food box;

a heating main body, comprising:

a base, defining an accommodating cavity for accommodating the food box;

a built-in power supply, a heating module, and a processor; and a touch display screen attached to an outer side of the base;

wherein, the processor is electrically or communicatively connected to the built-in power supply, the heating module, and the touch display screen; the built-in power supply is configured to supply electric power to the heating module, the touch display screen, and the processor;

the touch display screen is configured to display heating related information and receive at least one heating setting instruction input by user;

the processor is configured to acquire at least a heating start time according to the at least one heating setting instruction, and the heating module is configured to start heating the food box accommodated in the accommodating cavity according to the heating start time;

wherein the touch display screen is configured to display a current time setting control and a meal time setting control; the current time setting control is configured to set a current time, when the meal time setting control is triggered, the touch display screen is configured to a meal time setting interface configured to set the predetermined meal time, and the processor is configured to calculate the heating start time based on the current time, a preset heating duration and the predetermined meal time.

2. The heating lunch box according to claim 1, wherein the at least one heating setting instruction comprises an instant heating duration; the touch display screen is further configured to display an initial interface, wherein the initial interface provides an instant heating control, and when the instant heating control is triggered, the touch display screen is configured to display a heating setting interface; and the heating setting interface is configured to set the instant heating duration.

3. The heating lunch box according to claim 1, wherein the processor is further configured to detect remaining power of the built-in power supply in real time and display the remaining power information on a display interface of the touch display screen.

4. The heating lunch box according to claim 1, further comprising a cover, wherein the accommodating cavity of the base defines an upper opening, the food box is capable of being placed into the accommodating cavity via the upper opening, and the cover is configured to cover both the food box and the upper opening of the base;

wherein the cover is capable of being configured as a tray for the food box, and comprises at least one positioning component for abutting against an outer wall of the food box and positioning the food box in the tray.

5. The heating lunch box according to claim 4, wherein a number of the positioning components is at least two, and the at least two positioning components are arranged on the inner side of the cover facing the base, the at least two positioning components are uniformly distributed around the circumference of the cover, and each of the at least two positioning components extends in a direction away from the outer side of the cover and towards a center of an inner side of the cover.

6. The heating lunch box according to claim 4, wherein the cover comprises a sealing member, an inner sealing ring arranged along a circumferential direction of the cover, and an outer sealing ring located on the periphery of the inner sealing ring, a sealing groove is formed between the outer sealing ring and the inner sealing ring, and the sealing member is accommodated in the sealing groove; the at least one positioning component is positioned at an inner side of the inner sealing ring away from the outer sealing ring.

7. A heating lunch box, comprising:

a food box;

a heating main body, comprising:

a base, defining an accommodating cavity for accommodating the food box;

a built-in power supply, a heating module, and a processor; and a touch display screen attached to an outer side of the base;

wherein, the processor is electrically or communicatively connected to the built-in power supply, the heating module, and the touch display screen; the built-in power supply is configured to supply electric power to the heating module, the touch display screen, and the processor;

the touch display screen is configured to display heating related information and receive at least one heating setting instruction input by user;

the processor is configured to acquire at least a heating start time according to the at least one heating setting instruction, and the heating module is configured to heat the food box accommodated in the accommodating cavity according to the heating start time;

wherein the heating lunch box further comprising a cover, wherein the accommodating cavity of the base defines an upper opening, the food box is capable of being placed into the accommodating cavity via the upper opening, and the cover is configured to cover both the food box and the upper opening of the base;

wherein the cover comprises a main plate and a pair of first fastening components foldably connected to and extending from opposite sides of the main plate, a pair of clasp members is protruded from opposite sides of the base and located near the upper opening of the base, the pair of the first fastening components is engaged with the pair of clasp members;

wherein a through hole is defined in each first fastening component, each clasp member comprises a flange protrudes from an outer wall of the base and a barb portion connected to a free end of the flange; the barb portion is configured to penetrate the through hole for securing the cover to the base;

wherein each of the pair of first fastening components comprises a first fastening plate and a first fastening member, the first fastening plate is foldable relative to the main plate of the cover, the through hole is defined in the first fastening plate and located at one side of the first fastening member away from the main plate of the cover, and a convex edge protrudes from a peripheral edge of the food box and configured to be fastened with the first fastening member, thereby securing the cover to the food box.

8. The heating lunch box according to claim 7, wherein a recess groove is defined in an outside of the base, when the first fastening component is securely engaged with the clasp member, the first fastening component is accommodated in the recess groove, the clasp member is located at a bottom of the recess groove, and extends outwardly from the bottom in a direction away from the recess groove.

9. The heating lunch box according to claim 7, wherein the cover comprises a pair of second fastening components which comprises a second fastening plate and a second fastening member, the second fastening plate is foldable relative to the cover, the second fastening member is arranged on the second fastening plate; a convex edge protrudes from a peripheral edge of the food box and configured to be fastened with the second fastening member, thereby securing the cover to the food box.

10. A heating lunch box, comprising:

a food box; and a shell, comprising a base and a cover, wherein the base defines an accommodating cavity having an upper opening, the food box is capable of being placed in the accommodating cavity, and the cover is configured for being placed at the upper opening and covering the food box;

the cover comprises a main plate and a foldable fastening component connected to and extending from an edge of the main plate, a through hole is defined in the foldable fastening component, a clasp member is protruded from an outer wall of the base and engaged with the through hole, thereby firmly connecting the base to the cover;

wherein the clasp member comprises a flange protrudes from an outer wall of the base and a barb portion connected to a free end of the flange; the barb portion is configured to penetrate the through hole for securing the cover to the base; and the foldable fastening component comprises a first fastening plate and a first fastening member, the first fastening plate is foldable relative to the main plate of the cover, the through hole is defined in the first fastening plate and located at one side of the first fastening member away from the main plate of the cover, and a convex edge protrudes from a peripheral edge of the food box and configured to be fastened with the first fastening member, thereby securing the cover to the food box.

11. The heating lunch box according to claim 10, wherein the cover is capable of being configured as a tray for the food box, and comprises at least one positioning component for abutting against an outer wall of the food box and positioning the food box in the tray.

* * * * *